(12) United States Patent
Kin et al.

(10) Patent No.: US 7,279,093 B2
(45) Date of Patent: Oct. 9, 2007

(54) MODULE FOR REMOVING ORGANIC COMPOUNDS FROM FOAMING WASTEWATER BY OXIDATION

(75) Inventors: Kon-Tsu Kin, Hsinchu (TW); Pei-Lin Chang, Hsinchu (TW); Kuang-An Yang, Hsinchu (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 465 days.

(21) Appl. No.: 11/039,818

(22) Filed: Jan. 24, 2005

(65) Prior Publication Data

US 2005/0126972 A1 Jun. 16, 2005

Related U.S. Application Data

(63) Continuation-in-part of application No. 10/310,863, filed on Dec. 6, 2002, now Pat. No. 6,893,559.

(51) Int. Cl.
*C02F 1/32* (2006.01)
*C02F 1/78* (2006.01)

(52) U.S. Cl. ............... 210/188; 210/192; 210/195.1; 96/177

(58) Field of Classification Search ............ 210/748, 210/760, 765, 908, 909, 194, 195.1, 198.1, 210/205, 192, 188; 96/134, 154, 177, 178; 422/186.07, 186.3

See application file for complete search history.

(56) References Cited

U.S. PATENT DOCUMENTS

| | | | | |
|---|---|---|---|---|
| 5,427,693 A | * | 6/1995 | Mausgrover et al. | 210/739 |
| 5,512,178 A | * | 4/1996 | Dempo | 210/638 |
| 5,547,590 A | * | 8/1996 | Szabo | 210/748 |
| 5,709,799 A | * | 1/1998 | Engelhard | 210/748 |
| 5,711,887 A | * | 1/1998 | Gastman et al. | 210/748 |
| 6,096,219 A | * | 8/2000 | Green et al. | 210/695 |
| 6,132,629 A | * | 10/2000 | Boley | 210/760 |
| 6,267,895 B1 | * | 7/2001 | Engelhard et al. | 210/748 |
| 6,365,048 B1 | * | 4/2002 | Masten et al. | 210/610 |
| 6,817,541 B2 | * | 11/2004 | Sands et al. | 239/8 |

* cited by examiner

*Primary Examiner*—Frank M. Lawrence
(74) *Attorney, Agent, or Firm*—Bacon & Thomas PLLC

(57) ABSTRACT

The present invention discloses a module for processing foaming wastewater containing organic compounds. The UV/ozone oxidation removal module mainly includes an ozone generator, an ozone injector, an ozone dissolution tank, a gas-liquid separator, an ozone destruct unit, a UV reaction tank, a recycling pipeline. The gas-liquid separator contains a stainless tank with an adsorbent inside, preferably activated carbon, for removing foams and a portion of ozone, so that foams are prevented from entering and adversely affecting the ozone destruct unit, and thus a foaming organic wastewater can be treated with the UV/ozone oxidation removal module of the present invention.

5 Claims, 3 Drawing Sheets

MODULE FOR REMOVING ORGANIC COMPOUNDS FROM FOAMING WASTEWATER BY OXIDATION

This application is a continuation-in-part application of U.S. application Ser. No. 10/310,863, filed Dec. 6, 2002, now U.S. Pat. No. 6,893,559.

FIELD OF THE INVENTION

The present invention relates to the oxidation removal of organic compounds from the wastewater generated by industrial processes related to the fabrication of semiconductor devices, LCDs, etc., particularly to a process and a device for removing organic compounds from a wastewater by oxidation by injecting ozone into the wastewater and irradiating the water with UV light.

BACKGROUND OF THE INVENTION

Due to the continuous expansions in the IC and LCD production capacities, in which 30% or more of the water consumption is from cleaning, the amount of the organic wastewater increases in multiples. Further, the Science Parks in Taiwan demand a newly built semiconductor process to have a water recovery ratio (recycling from the discharged Water to the ultra-pure water system and other secondary water use system) of more than 85%. The required water recovery ratio for an existing plant is 75%. Therefore, the advocacy of recovery and reuse for the process water is of great urgency.

The applicant of the present application discloses a process and a system for processing wastewater containing organic compounds in US patent publication No. US2003-0106855A1. The system includes a UV/ozone oxidation removal module, or one or more removal modules connected in series whereas such a serial connection can be continuous or discontinuous. A UV/ozone oxidation removal module mainly includes an ozone generator, an ozone injector, an ozone dissolution tank, a gas-liquid separator, an ozone destruct unit, a UV reaction tank, and a recycling pipeline. The efficiency of this UV/ozone oxidation removal module is good in treating the wastewater containing no foaming substance. A suitable gas-liquid separator for use in this US patent publication includes a centrifugal type degassing separator, for example the GDM™ degassing separator, available from GDT Water Process Corporation (U.S. Pat. No. 5,674,321). The GDM™ degassing separator has a tank of 316L stainless steel, and a centrifugal device mounted in the tank for destroying foams into liquid and gas, thereby the resulting liquid exits from the bottom of the tank and the resulting gas rises to the ozone destruct unit on the top of the tank. However, the cleaning procedures adopted by the photoelectric industries use surfactants, detergents or like organic chemicals, so that the effluent comprising foams, moisture, ozone or other gases is cannot be separated sufficiently in the degassing separator, which exits from a constant pressure valve connected to the top of said ozone dissolution tank. Consequently, a portion of the foams prevails and flows into the ozone destruct unit, causing the ozone destruct unit flooding, and thus the operation of UV/ozone oxidation removal module will have to be stopped. Therefore, the function of the UV/ozone oxidation removal module cannot be fully achieved when a foaming wastewater containing organic contaminants is to be treated.

SUMMARY OF THE INVENTION

A primary objective of the present invention is to provide an improvement to the UV/ozone oxidation removal module disclosed in US patent publication No. US2003-0106855A1, so that a foaming wastewater can be treated and organic contaminants contained therein can be removed.

An oxidation removal module constructed according to the present invention for treating wastewater containing organic compounds comprises:

an ozone injector adapted to be separately connected to a pump for feeding to-be-treated water, and an ozone generator, wherein said ozone injector is used to mix said to-be-treated water with an ozone source gas from said ozone generator;

an ozone dissolution tank for receiving a resulting ozone/wastewater mixture from said ozone injector and providing a residence time for ozone to perform an oxidation reaction with the organic compounds in said to-be-treated water;

a UV reaction tank for receiving an ozone-containing wastewater from said ozone dissolution tank and radiating said ozone-containing wastewater with a UV light to enable the organic compounds in the wastewater to undergo a photo-chemical oxidation;

a centrifugal type degassing separator connected to a top of said ozone dissolution tank, a constant pressure valve connected to said centrifugal type degassing separator, an adsorption type gas-liquid separator connected to said constant pressure valve, and an ozone destruct unit connected to said gas-liquid separator, wherein said degassing separator receives a mixture containing ozone, moisture and foams and destroys the foams, said constant pressure valve maintains a constant pressure in said degassing separator and discharges a mixture containing ozone, moisture and the remaining foams to said gas-liquid separator when the pressure is higher than a set value, wherein said gas-liquid separator comprises an adsorbent for adsorbing the ozone, moisture and the remaining foams, prolonging a residence time of the ozone, moisture and the remaining foams in the gas-liquid separator, so that liquid water is formed in the gas-liquid separator and can be withdrawn at a bottom thereof, and ozone and gases not-dissolved in the liquid water flow upwardly into said ozone destruct unit;

an optional auxiliary purification element, which is a membrane treatment element, an ion exchange element, an activated carbon adsorption element, or a degassing element, for further purifying an effluent discharged from the UV reaction tank; and a recycling mechanism, which comprises a recycling pipeline for recycling a portion of the effluent from the UV reaction tank, or an effluent from said auxiliary purification element, if said auxiliary purification element exists, to a stream of said to-be-treated water; an outlet pipeline for guiding the other portion of said effluent to a next stage; and one or more valves for controlling the flow rate ratio between of the portion of the effluent recycled and the other portion of the effluent discharged to the next stage.

Preferably, said adsorbent is activated carbon.

Preferably, said adsorption type gas-liquid separator comprises a net for supporting the adsorbent and preventing the adsorbent from exiting.

Preferably, the resulting water from the destroying of the foams in said centrifugal type degassing separator is recycled to a point between said pump and the ozone injector, and is combined with the to-be-treated water.

Preferably, said recycling mechanism comprises a flow control valve located on said outlet pipeline; another flow control valve located on said recycling pipeline; and a check valve installed at a location prior to said recycling pipeline entering the stream of said to-be-treated water for preventing said to-be-treated water from entering said recycling pipeline.

The present invention also provides a system for removal of organic compounds from wastewater by oxidation, which comprises a plurality of the abovementioned modules connected in series and, optionally, one or more auxiliary purification elements connected in series between two adjacent modules, wherein said auxiliary purification element is a membrane treatment element, an ion exchange element, an activated carbon adsorption element, or a degassing element, for further treating an effluent from a previous stage.

DETAILED DESCRIPTION OF THE INVENTION

Figure 1:
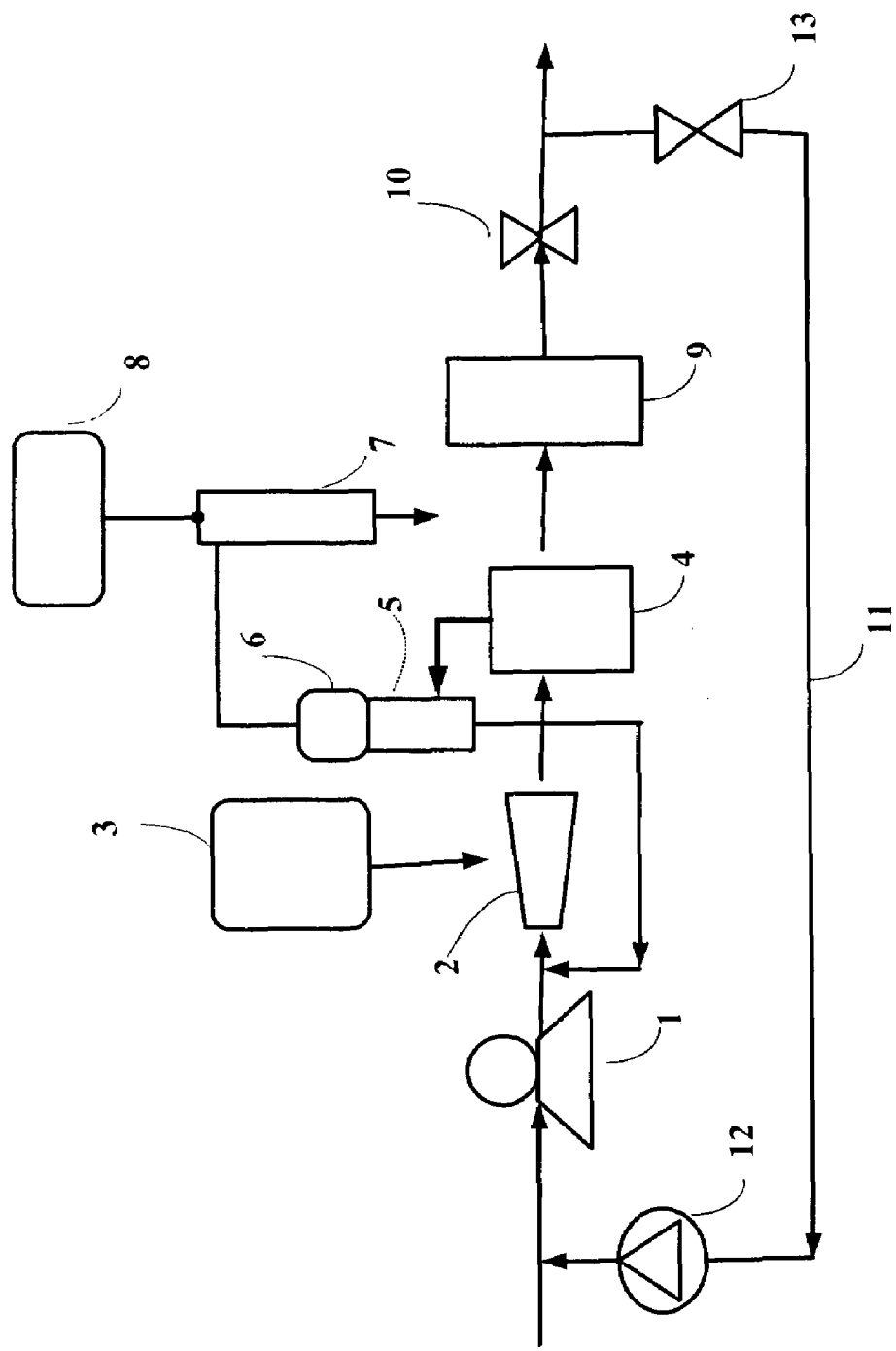
FIG. 1 shows a block diagram of an oxidation removal module for removing organic compounds from a foaming wastewater constructed according to a preferred embodiment of the present invention.
Figure 2:
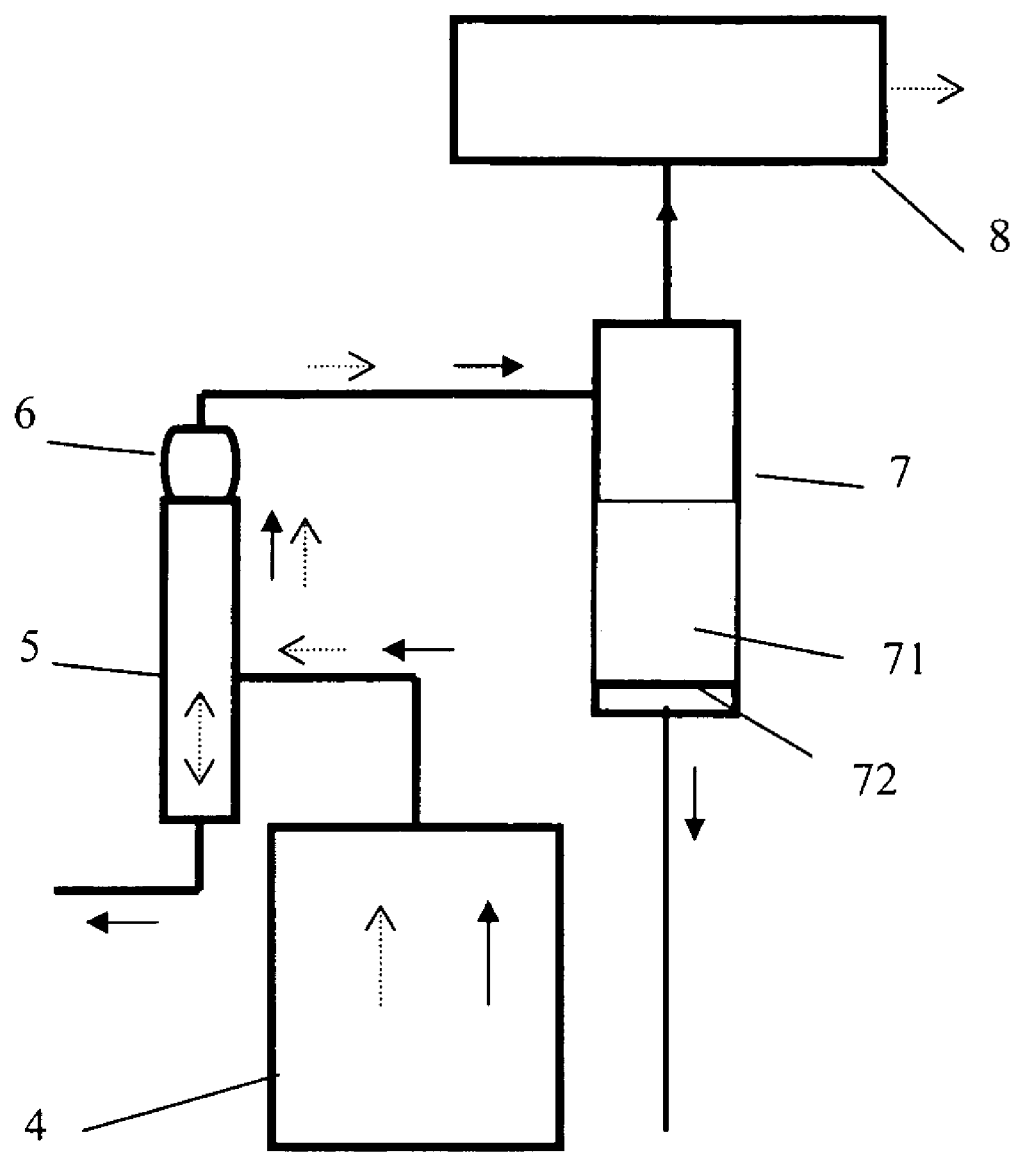
FIG. 2 shows a partial block diagram of the oxidation removal module shown in FIG. 1.

The cleaning procedures adopted by the high-tech industries use surfactants, detergents or like organic chemicals, so that the wastewater generated is liable to form foams. The present invention provides an oxidation removal module for treating this foaming wastewater to remove organic contaminants contained therein. An oxidation removal module according to a preferred embodiment of the present invention is shown in FIGS. 1 and 2, wherein a pump 1 draws in to-be-treated water to an ozone injector 2. The ozone injector 2 sucks in a gas and mixes it with water, and is made of a material resistant to the corrosion of ozone. Through the adjustment of the pump 1 and a flow control valve 10, an ozone gas at a different flow rate can be sucked in. The ozone gas is generated by an ozone generator 3 and is provided to the ozone injector 2. Subsequently, the ozone/wastewater mixture mixed by the ozone injector 2 enters an ozone dissolution tank 4, which provides time and space for contact of the gas. The ozone dissolution tank 4 is made of 316 L stainless steel material or other ozone-resistant material. A mixture of foams, moisture, non-dissolved ozone and gases will be generated as a result of the mixing/reaction of the ozone and the wastewater in the ozone dissolution tank 4, which exits from the top thereof and enters into a centrifugal type degassing separator 5. In the centrifugal type degassing separator 5, a portion of the foams are destroyed and the resulting water flows back to a point prior to the ozone injector 2 and joins the to-be-treated water or to a drain or a storage tank of the to-be-treated water. A constant pressure valve 6 maintains the centrifugal type degassing separator 5 at a specified pressure, and discharges a mixture of ozone, moisture and the remaining foams higher than the specified pressure to a adsorption type gas-liquid separator 7, and is further connected to an ozone destruct unit 8. The adsorption type gas-liquid separator 7 can convert the remaining foams into a liquid water and a gas, and avoid foams from entering the ozone destruct unit 8. The objective of the ozone destruct unit 8 is to decompose the ozone in the discharged gas. The wastewater flows out through the ozone dissolution tank 4, and then enters the UV reaction tank 9 to undergo a UV radiation oxidation reaction. The UV lamp in the tank can initiate a photochemical oxidation reaction in the water flowing through the tank. In the present embodiment, a medium pressure mercury lamp is used. In practice, a low pressure mercury lamp or a high pressure mercury lamp can also be used. The flow control valve 10 is installed at the outlet of the UV reaction tank 9, thereby controlling the outlet pressure at the rear end of the ozone injector 2. A recycling pipeline 11 is connected to the flow control valve 10, and recycles a portion of the treated water to a location upstream of the pump 1 to merge with the untreated wastewater, thereby diluting the TOC concentration in water and increasing the residence time of the wastewater. A check valve 12 is installed on the recycling pipeline before reaching the pump 1 to prevent the untreated wastewater from entering the recycling pipeline. Another flow control valve 13 is installed on the recycling pipeline 11, thereby controlling the ratio of the recycled flow to the discharged flow. The recycling ratio, (recycling ratio)=(recycled water flow rate):(discharged water flow rate), of the system is controlled at 0.5:1~20:1.

The adsorption type gas-liquid separator 7 has a surge tank made of 316 stainless steel or other ozone-resistant material, and activated carbon 71 disposed inside the surge tank. Whenever there are residual foams in the effluent from the constant pressure valve 6, the residual foams will enter the surge tank and contact the activated carbon 71 of the adsorption type gas-liquid separator 7. Thanks to the large specific surface area of the activated carbon 71, the foams, moisture, non-dissolved ozone and gases will be adsorbed the activated carbon 71, prolonging the residence time thereof in the surge tank, so that the foams burst out and turn into liquid water and gas, and thus foams are prevented from entering the ozone destruct unit 8. The non-dissolved ozone and gases flow upwardly into the ozone destruct unit 8, where the ozone is decomposed to oxygen and expelled. Preferably, the surge tank is provided with a door, so that the activated carbon or other suitable adsorbent can be replaced as required. A stainless steel mesh 72 with a mesh number of 80 is provided in the surge tank to retain the activated carbon inside the surge tank.

Figure 3:
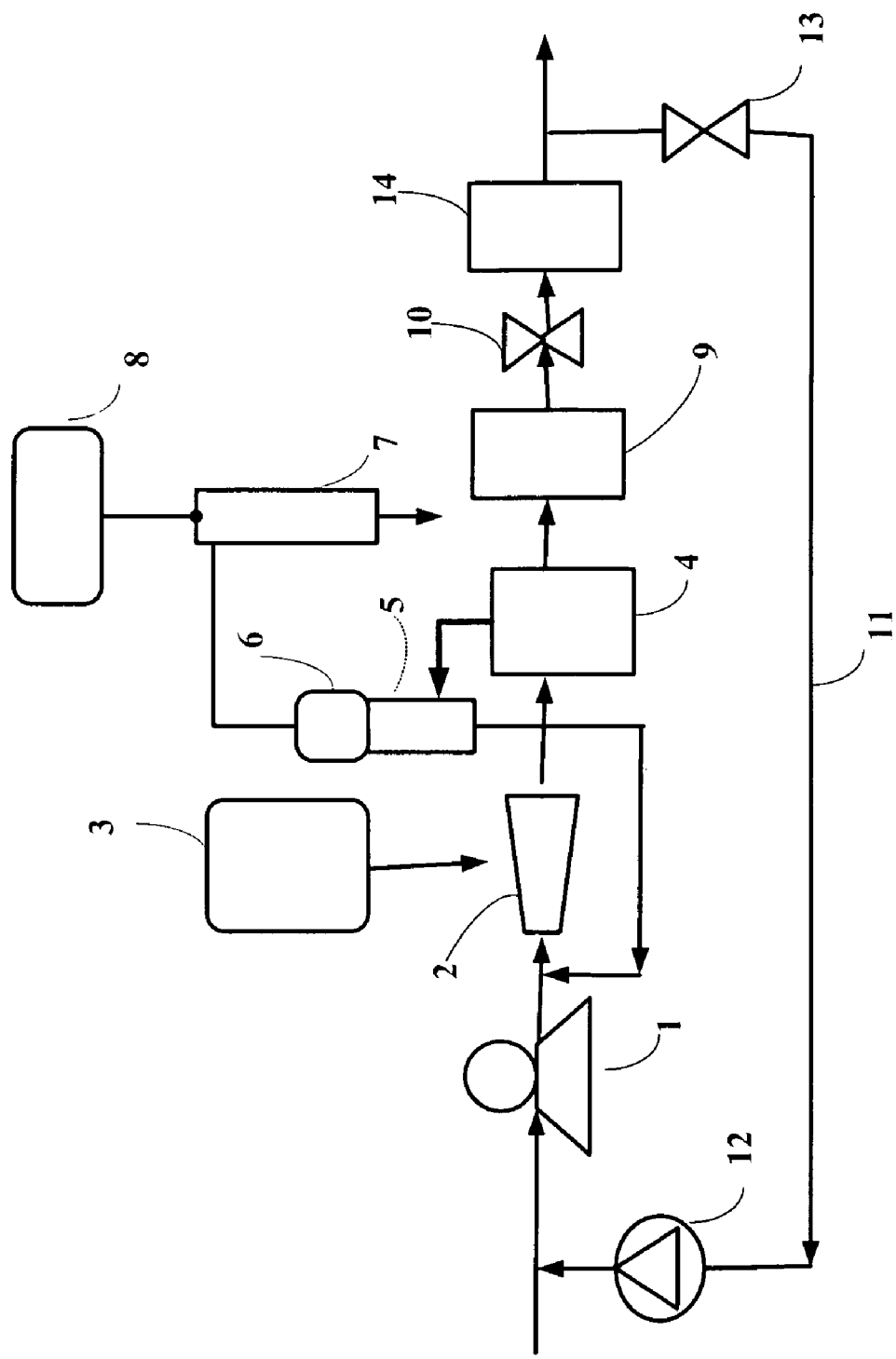
FIG. 3 shows a block diagram of an oxidation removal module for removing organic compounds from a foaming wastewater constructed according to another preferred embodiment of the present invention.

FIG. 3 shows a variation where a purification element 14 is installed in the oxidation removal module shown in FIG. 1. The water discharged from the flow control valve 10 enters the purification element 14, e.g. a membrane treatment element, an ion-exchange element, an activated carbon adsorption element, a degassing element, etc., in order to remove the ionic matters and the particulate matters in water or generated by the oxidation reaction, or the over-saturated gas generated in the dissolution process.

Control Example:

A module as shown in FIG. 1 of U.S. patent publication No. US2003-0106855A1 was used to carry out an organic oxidation removal experiment in a surfactant-containing wastewater containing a TOC of 22 ppm.

The ozone concentration in the ozone/wastewater mixture in the ozone injector was maintained at 25 ppm. The experiment was stopped after the module was operated for 3 minutes, because a flooding occurred at the ozone destruct unit.

EXAMPLE

The experimental steps in Control Example were repeated, except that the module used therein was replaced by the module shown in FIG. 1 of the present application.

The TOC of the influent was reduced from 22 ppm to 0.5 ppm, and no flooding at the ozone destruct unit was observed. Instead, an effluent of a small amount of water was observed at an outlet pipe connected to the bottom of the surge tank of the adsorption gas-liquid separator 7.

The invention claimed is:

1. An oxidation removal module for treating wastewater containing organic compounds comprising:

an ozone injector adapted to be separately connected to a pump for feeding to-be-treated water, and an ozone generator, wherein said ozone injector is used to mix said to-be-treated water with an ozone source gas from said ozone generator;

an ozone dissolution tank for receiving a resulting ozone/wastewater mixture directly from said ozone injector and providing a residence time for ozone to perform an oxidation reaction with the organic compounds in said to-be-treated water;

a centrifugal type degassing separator connected to a top of said ozone dissolution tank, a constant pressure valve connected to said centrifugal type degassing separator, an adsorption type gas-liquid separator connected to said constant pressure valve, and an ozone destruct unit connected to said gas-liquid separator, wherein said degassing separator receives a mixture containing ozone, moisture and foams and destroys the foams, said constant pressure valve maintains a constant pressure in said degassing separator and discharges a mixture containing ozone, moisture and the remaining foams to said gas-liquid separator when the pressure is higher than a set value, wherein said gas-liquid separator comprises an adsorbent for adsorbing the ozone, moisture and the remaining foams, prolonging a residence time of the ozone, moisture and the remaining foams in the gas-liquid separator, so that liquid water is formed in the gas-liquid separator and can be withdrawn at a bottom thereof, and ozone and gases not-dissolved in the liquid water flow upwardly into said ozone destruct unit;

a UV reaction tank for receiving an ozone-containing wastewater from said ozone dissolution tank and radiating said ozone-containing wastewater with a UV light to enable the organic compounds in the wastewater to undergo a photo-chemical oxidation;

an optional auxiliary purification element, which is a membrane treatment element, an ion exchange element, an activated carbon adsorption element, or a degassing element, for further purifying an effluent discharged from the UV reaction tank; and a recycling mechanism, which comprises a recycling pipeline for recycling a portion of the effluent from the UV reaction tank, or an effluent from said auxiliary purification element, if said auxiliary purification element exists, to a stream of said to-be-treated water; an outlet pipeline for guiding the other portion of said effluent to a next stage; and one or more valves for controlling the flow rate ratio between the portion of the effluent recycled and the other portion of the effluent discharged to the next stage.

2. The module as claimed in claim 1, wherein said adsorbent is activated carbon.

3. The module as claimed in claim 1, wherein said adsorption type gas-liquid separator comprises a net for supporting the adsorbent and preventing the adsorbent from exiting.

4. The module as claimed in claim 1, wherein the resulting water from the destroying of the foams in said centrifugal type degassing separator is recycled to a point between said pump and the ozone injector, and is combined with the to-be-treated water.

5. The module as claimed in claim 1, wherein said recycling mechanism comprises a flow control valve located on said outlet pipeline; another flow control valve located on said recycling pipeline; and a check valve installed at a location prior to said recycling pipeline entering the stream of said to-be-treated water for preventing said to-be-treated water from entering said recycling pipeline.

* * * * *